United States Patent Office.

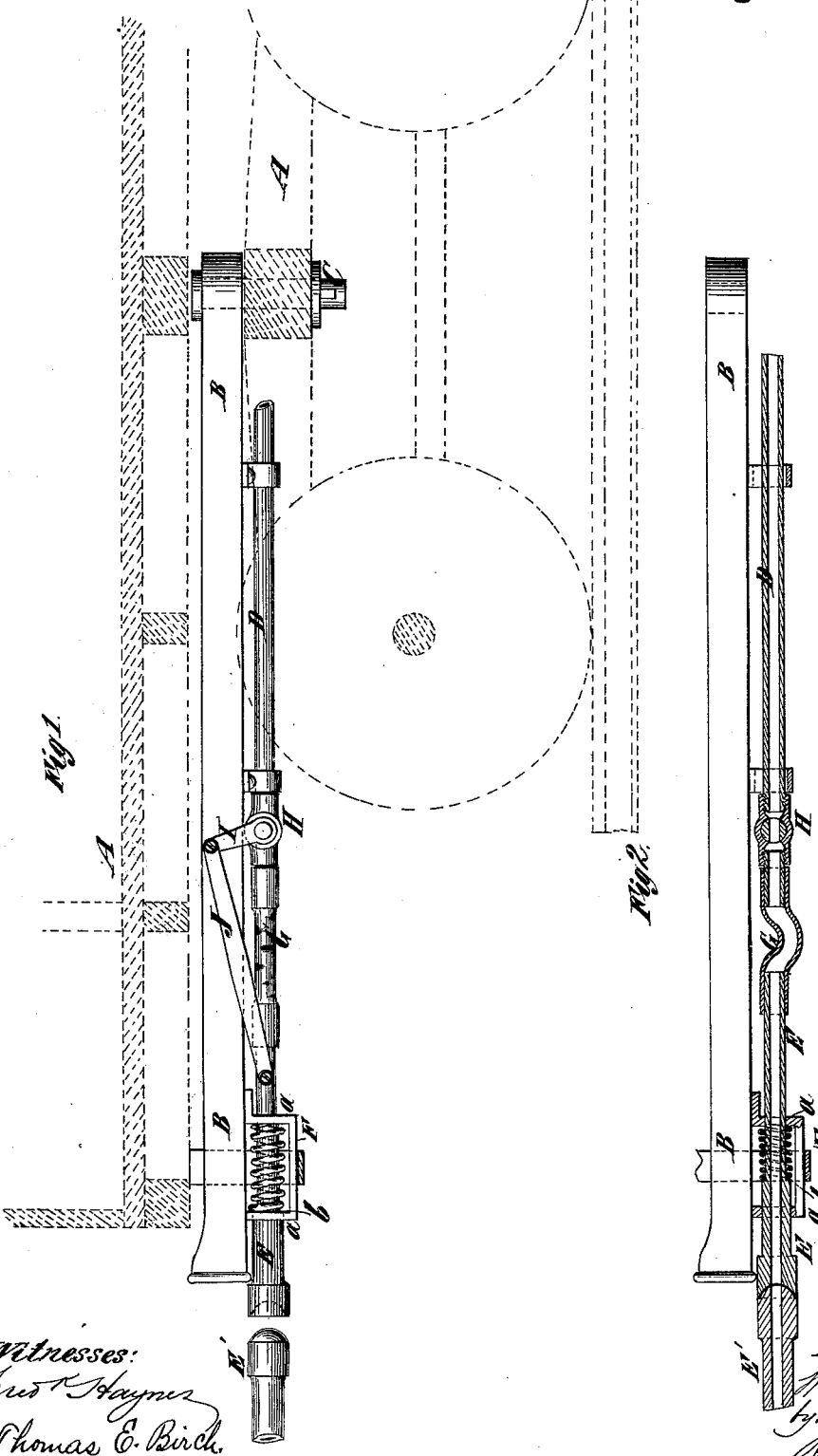

WILLIAM N. HARING, OF JERSEY CITY, NEW JERSEY, ASSIGNOR OF ONE-HALF OF HIS RIGHT TO JOHN C. KLATZL, OF NEW YORK, N. Y.

COUPLING FOR CAR-BRAKES.

SPECIFICATION forming part of Letters Patent No. 231,564, dated August 24, 1880.

Application filed April 24, 1880. (No model.)

*To all whom it may concern:*

Be it known that I, WILLIAM N. HARING, of Jersey City, in the county of Hudson and State of New Jersey, have invented certain new and useful Improvements in Couplings for Car-Brakes, of which the following is a specification.

My invention relates to the couplings employed for uniting the pipes or hose of vacuum or air brakes carried by the several cars of a train.

My invention consists in the combination, with a support comprised in a car, of a stationary section of hose or pipe secured thereto, a yielding terminal or movable section adapted to be moved inward by contact with a pipe carried by an adjacent car, and a flexible hose-connection between said stationary section and terminal or movable section. To provide for automatically regulating the passage of air or other operating agent through the hose or pipes, I employ a valve arranged in the stationary section and connected with the terminal or movable section, so that the inward or outward movement of the latter either opens or closes said valve.

My invention also consists in various details of construction and combinations of parts, hereinafter described.

In the accompanying drawings, Figure 1 represents a sectional view of a portion of a car in dotted outline, and a side view of a draw-bar and a hose or pipe coupling embodying my invention; and Fig. 2 represents a longitudinal section through said coupling after the terminal or movable section has been moved inward by coupling.

Similar letters of reference designate corresponding parts in both figures.

A designates a dotted outline of a portion of a car; and B designates a draw-bar, pivoted by a king-bolt, C, at its inner end, so as to swing freely in a lateral direction.

D designates a stationary section of hose or pipe secured to a support comprised in the car. This support, in the present example of my invention, consists of the draw-bar B; but the said hose or pipe might be secured to the under side or bottom of the car-body, if desirable. This stationary section of hose or pipe is shown as broken off; but it may extend under the entire length of the car and communicate with any source of supply of air or other motive agent.

E designates a terminal or movable section arranged concentric with the stationary section and supported in suitable bearings $a$ $a$, which permit of its moving longitudinally upon coming in contact with a section of hose or pipe carried by an adjacent car. The hose or pipe carried by the adjacent car is preferably also provided with a yielding terminal or movable section, E', and in order to facilitate their coupling and insure their being concentric one with the other, one of the terminals or movable sections is made concave upon its end and the other is correspondingly convex, as represented clearly in Fig. 2.

The concave end of the terminal or movable section E may be lined with felt or other packing material, if desirable, so as to insure a tight joint between it and the terminal E'.

In order to maintain a tight face-to-face contact between the two terminals or movable sections E E', I employ a spring, F, coiled around the movable section E, within the bearing $a$ $a$ and between one end thereof, and a shoulder, $b$, formed by the end of terminal E. In lieu of this spiral spring a leaf or other spring might be employed.

I have here represented the terminal E as connected to the stationary section D by means of a flexible hose-connection, G, so as to permit of the longitudinal movement of the terminal E; but in lieu of this they might be connected by a telescopic joint, one being made to slide within the other.

In order to automatically regulate the passage of air or other motive agent through the hose or pipe, I provide the stationary section D with a valve, H, here represented as consisting of a simple cock, though a valve of other construction might be employed. This valve is provided with a lever or handle, I, by which it may be operated, and which is connected to the terminal by a link or connecting-rod, J, so that the longitudinal movement of the terminal turns the plug of the valve and controls the passage of air or other motive agent through the hose or pipes.

By my invention I provide for automatically coupling as well as uncoupling the hose or pipe of car-brakes, thereby rendering their proper coupling certain, and avoiding accidents resulting from a failure to couple them, which are liable to occur where the coupling must be done by hand.

What I claim as my invention, and desire to secure by Letters Patent, is—

1. The combination, with a support comprised in a car, of a stationary section of hose or pipe secured thereto, a yielding terminal or movable section adapted to move inwardly on contact with a pipe carried by an adjacent car, and a flexible hose-connection between said stationary section and terminal or movable section, substantially as and for the purpose specified.

2. The combination, with a support comprised in a car, of a stationary section of hose or pipe secured thereto, a yielding terminal or movable section, and a valve in said stationary section which is automatically opened by the inward movement of the yielding terminal or movable section, substantially as specified.

3. The combination, with a support comprised in a car, of the stationary section D, the yielding terminal E, the bearing $a\ a$ for said terminal, and the spring F, arranged within said bearing between an end thereof and the end $b$ of said terminal, all arranged and operating substantially as specified.

4. The combination, with a support comprised in a car, of the stationary section D, the yielding terminal E, the valve H in said stationary section, the lever or handle I, and the link or connecting-rod J, substantially as specified.

WILLIAM N. HARING.

Witnesses:
 E. P. JESSUP,
 CHANDLER HALL.